United States Patent [19]

Ono et al.

[11] Patent Number: 5,039,761

[45] Date of Patent: Aug. 13, 1991

[54] METHACRYL FUNCTION DIMETHYLPOLYSILOXANES AND GRAFT COPOLYMERS THEREOF

[75] Inventors: Ichiro Ono, Annaka; Hiroshi Yoshioka, Tokyo, both of Japan

[73] Assignee: Shin-Etsu Chemical Co., Ltd., Tokyo, Japan

[21] Appl. No.: 407,103

[22] Filed: Sep. 14, 1989

[30] Foreign Application Priority Data

Sep. 16, 1988 [JP] Japan .................................. 63-229856

[51] Int. Cl.$^5$ .......................................... C08F 283/00
[52] U.S. Cl. ...................................... 525/479; 528/25; 528/34; 528/41; 556/440

[58] Field of Search ...................... 528/34, 41, 25; 556/440; 525/479

[56] References Cited

U.S. PATENT DOCUMENTS 4,575,545  3/1986  Nakos et al. .................. 525/479
4,605,712  8/1986  Mueller et al. .................. 525/479

*Primary Examiner*—Melvyn I. Marquis
*Assistant Examiner*—M. Glass
*Attorney, Agent, or Firm*—Birch, Stewart, Kolasch & Birch

[57] ABSTRACT

Novel methacryl functional dimethylpolysiloxanes are provided. Graft copolymers thereof with vinyl monomers exhibit water repellency, mold release properties, slip properties, weatherability, and gas permeability.

4 Claims, 5 Drawing Sheets

METHACRYL FUNCTION DIMETHYLPOLYSILOXANES AND GRAFT COPOLYMERS THEREOF

FIELD OF THE INVENTION

The present invention relates to a novel methacryl functional dimethylpolysiloxane and a graft copolymer obtained by copolymerizing such a methacryl functional dimethylpolysiloxane with a vinyl monomer.

BACKGROUND OF THE INVENTION

A variety of organopolysiloxanes have been proposed in the prior art. Copolymers obtained from such organopolysiloxanes are also well known. It is recently desired to obtain a graft copolymer having water repellency, mold release properties, slip properties, weatherability, and gas permeability among other properties. It is also, desired to have an organopolysiloxane which is useful as a reactant for producing such a graft copolymer.

The present invention is made to meet the abovementioned demand and its object is to provide a novel and improved organopolysiloxane capable of producing a graft copolymer having water repellency, mold release properties, slip properties, weatherability, and gas permeability and to provide a graft copolymer obtained therefrom.

SUMMARY OF THE INVENTION

The present inventors have discovered that a novel methacryl functional dimethylpolysiloxane having the general formula (1):

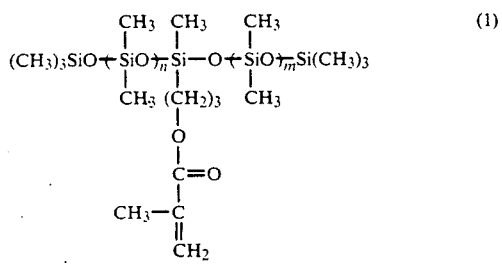

wherein letters n and m are independently an integer of from 2 to 50 and may be the same or different, is prepared by subjecting hexamethylcyclotrisiloxane having formula (2):

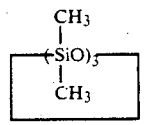

to ring opening polymerization in the presence of trimethylsilanol (CH$_3$)$_3$SiOH and a pentavalent silicon complex catalyst to synthesize two types of single silanol-terminated compounds having formulae (3) and (4):

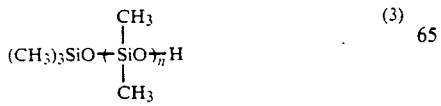

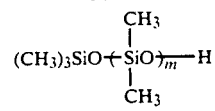

wherein letters n and m are as defined above, mixing the single silanol-terminated compounds of formulae (3) and (4) with γ-methacryloxypropylmethyldichlorosilane in equimolar amounts, and dehydrochlorinating the mixture in the presence of a hydrogen chloride scavenger such as a tertiary amine. The present inventors have also discovered that a graft copolymer having improved water repellency, mol drelease properties, slip properties, weatherability, and gas permeability is obtained by copolymerizing the methacryl functional dimethylpolysiloxane of formula (1) with a vinyl monomer having a polymerizable double bond.

Thus the present invention provides a methacryl functional dimethylpolysiloxane of formula (1) as well as a graft copolymer comprising a methacryl functional dimethylpolysiloxane of formula (1) and a vinyl monomer copolymerized therewith.

DETAILED DESCRIPTION OF THE INVENTION

Figure 1:
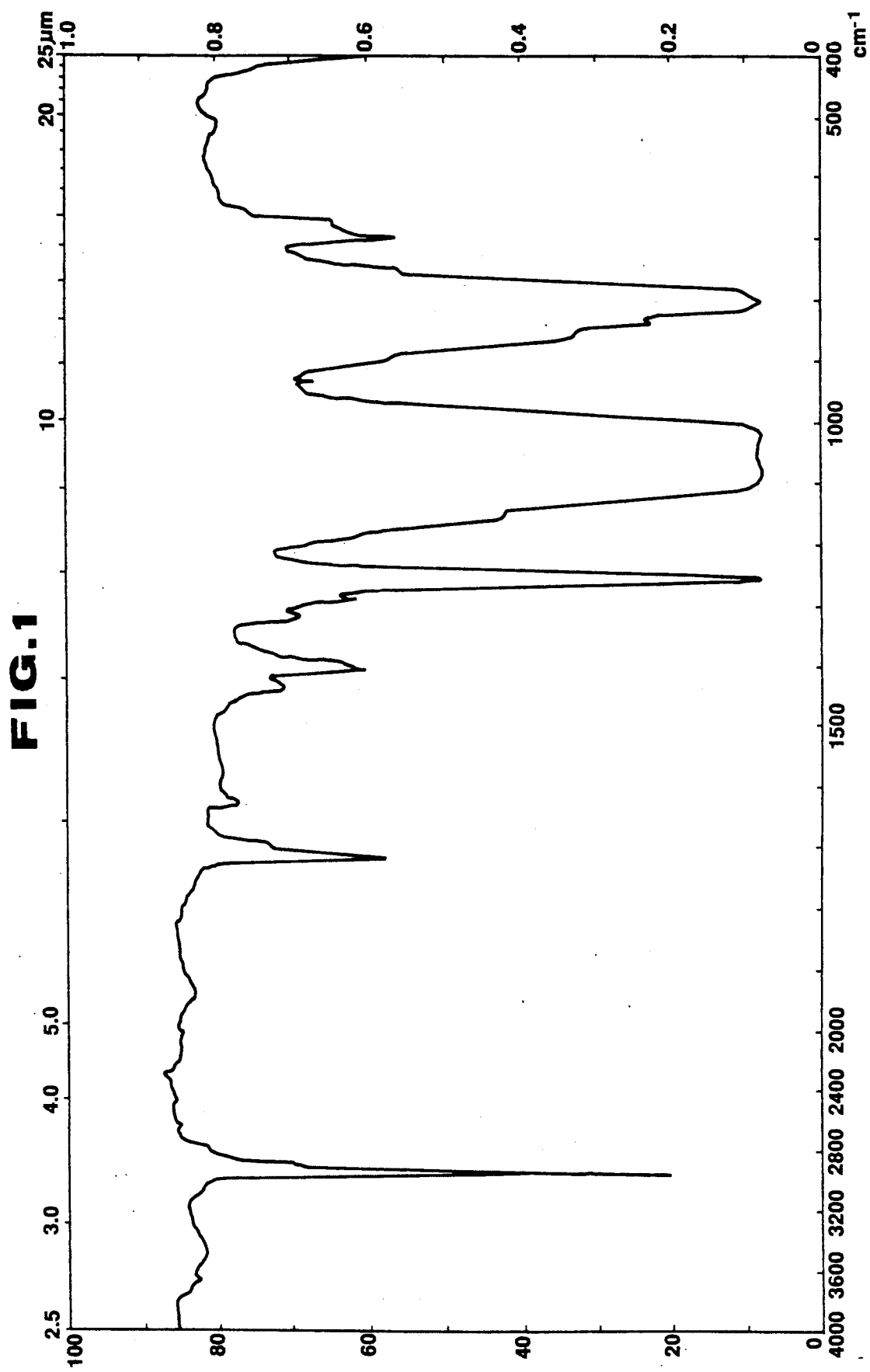
FIGS. 1 and 2 are diagrams showing the infrared absorption spectrum and NMR spectrum of Compound (II) synthesized in the Example, respectively.

The methacryl functional dimethylpolysiloxane of the present invention is a dimethylpolysiloxane having a methacryloxypropyl group attached as a side chain as seen from formula (1). Illustrative examples are the compounds of formulae (I) through (V) shown below.

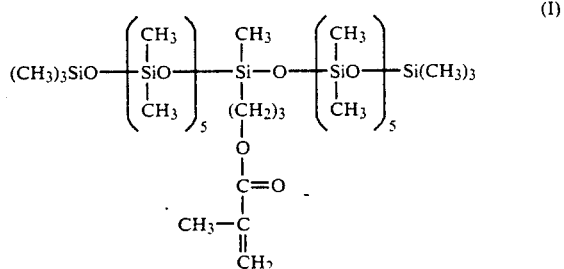

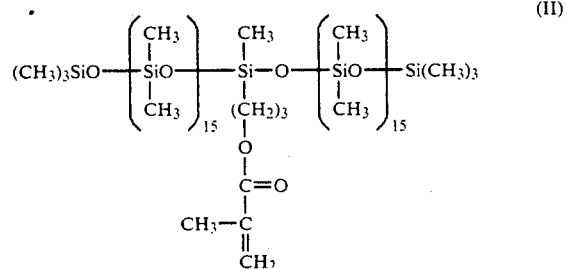

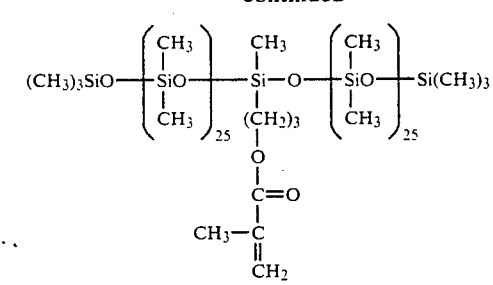

(III)

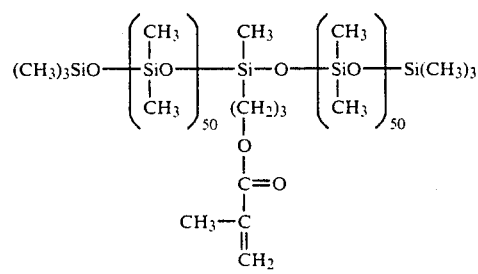

(IV)

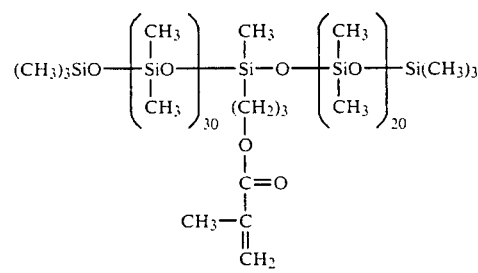

(V)

The methacryl functional dimehtylpolysiloxane of the present invention can be readily synthesized, for example, by mixing two types of single silanol-terminated compounds having formulae (3) and (4):

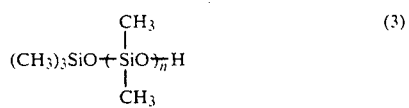

(3)

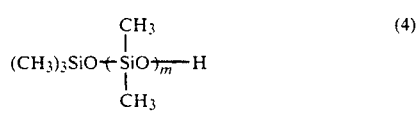

(4)

wherein letters n and ma are independently an integer of from 2 to 50 with γ-methacryloxypropylmethyldichlorosilane of formula (5):

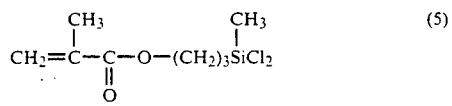

(5)

and dehydrochlorinating the mixture.

The single silanol-terminated compounds are preferably synthesized according to the methods disclosed in Japanese Patent Publication Nos. 1070/1970 and 44040/1972. More particularly, they are synthesized by subjecting hexamethylcyclotrisiloxane having formula (2):

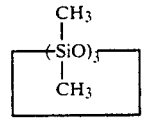

(2)

to ring opening polymerization in the presence of trimethylsilanol $(CH_3)_3SiOH$ and a pentavalent silicon complex catalyst such as

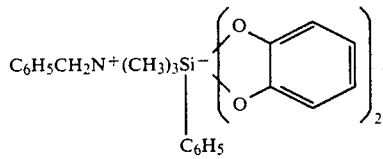

Various methods are known for the synthesis of single silanol-terminated compounds, for example, living polymerization using anion polymerization catalysts; acid catalyzed polymerization using sulfuric acid, trifluoromethanesulfonic acid, sulfonate group containing ion-exchange resins, hydrochloric acid, activated clay or the like; and alkali catalyzed polymerization using potassium hydroxide, lithium hydroxide, tetramethylammonium hydroxide, trimethylbenzylammonium hydroxide, tetrabutylphosphonium hydroxide or the like. It is not critical for the invention to disclose how to synthesize single silanol-terminated compounds in that any conventional synthetic methods may be used. However, the presence of a double silanol-terminated compound in the single silanol-terminated compounds as an impurity even in a minor amount can cause the final product, methacryl functional dimethylpolysiloxane to contain a difunctional methacrylate substituted siloxane. The methacryl functional dimethylpolysiloxane containing such a difunctional methacrylate substituted siloxane tends to invite gelation upon copolymerization with a vinyl monomer. For this reason, the present invention prefers ring opening polymerization using a pentavalent silicon complex catalyst for the synthesis of single silanol-terminated compounds. This process has an additional advantage that there are obtained single silanol-termiated compounds having a well controlled molecular weight and molecular weight distribution.

The dehydrochlorination of the mixture of the silanol compounds of formulae (3) and (4) and the compounds of formula (5) may be performed according to a conventional procedure. Preferably, dehydrochlorination is carried out by mixing the compounds of formulae (3), (4), and (5) in equimolar amounts, and adding thereto a tertiary amine such as triethylamine and pyridine as a hydrogen chloride scavenger. The hydrogen chloride scavenger is used in an equimolar or excess amount (1 to 2 times in mol) relative to the amount of the resulting hydrogen chloride. A diluting solvent may be added if desired. Examples of the diluting solvent include aromatic hydrocarbons such as benzene, toluene, and xylene, aliphatic hydrocarbons such as n-hexane and n-heptane, and ethers such as diethyl ether and dibutyl ether. The conditions for dehydrochlorination may be suitably chosen although it is desirable to carry out reaction at room temperature to about 120° C., more preferably about 40° C. to about 80° C. for about 30 minutes to about 5 hours.

The methacryl functional dimethylpolysiloxanes of the present invention may be used in a variety of applications as in the case of conventional organopolysiloxanes. The methacryl functional dimethylpolysiloxanes of the present invention can be copolymerized with vinyl monomers to form graft copolymers which have improved water repellency, mold release properties, slip properties, weatherability, and gas permeability and are thus useful as repellants for concrete, anti-sticker paint, anti.staining marine paint, and weather resistant paint.

The vinyl monomers which are reacted with methacryl functional dimethylpolysiloxanes of formula (1) include compounds having a polymerizable double bond, for example, low molecular weight hydrocarbons such as alklenes having 2 to 10 carbon atoms including ethylene, propylene, and butylene; acrylic acid and methacrylic acid and their derivatives, for example, alkyl esters having 1 to 20 carbon atoms such as methyl (meth)acrylate, butyl (meth)acrylate, and 2-ethylhexyl (meth)acrylate, hydroxyalkyl esters having 1 to 10 carbon atoms such as hydroxyethyl (meth)acrylate, acid amides such as acrylamide and methacrylamide, and perfluoroesters having 1 to 12 carbon atoms such as perfluorooctyl (meth)acrylate and perfluorobutyl (meth)acrylate; styrene and styrene derivatives such as αmethylstyrene and p-chloromethylstyrene; fumaric acid, maleic acid and derivatives thereof such as fumaric anhydride and maleic anhydride; unsaturated group-containing silane compounds such as vinyltrimethoxysilane and γ-methacryloxypropyltrimethoxysilane; and acrylonitrile, vinyl pyrrolidone, butadiene, isoprene, chloroprene, cyclopentadiene, vinyl chloride, vinylidene chloride, vinyl acetate, and vinyl ether type hydrocarbons, typically allyl vinyl ether. These monomers may be used alone or in admixture of two or more.

The blending ratio of the methacryl functional dimethylpolysiloxane of formula (1) and the vinyl monomer is not particularly limited although the vinyl monomer is preferably blended such that the resulting copolymer contains 1 to 50% by weight of the methacryl functional dimethylpolysiloxane of formula (1).

Copolymerization may be carried out by any desired conventional processes such as a process using a radical polymerization initiator, electron radiation exposure, and ultraviolet exposure. Among others, the polymerization process using a radical initiator is preferred with respect to operation and molecular weight control, and any mode of solution polymerization, bulk pclymerization, suspension polymerization, and emulsion polymerization may be employed for this process.

Examples of the radical polymerization initiator include peroxides such as benzoylperoxide, dicumylperoxide, and di-t-butylperoxide, and azo compounds such as azobisisobutyronitrile. The amount of the initiator added is not particularly limited although it is preferably added in.amounts of about 0.5 to about 5 parts by weight per 100 parts by weight of the entire reactants for the copolymer. The reaction temperature is generally between 50° C. and 150° C. and the reaction time is from about 1 to about 20 hours.

EXAMPLE

Examples of the invention are given below by way of illustration and not by way of limitation. All parts and percents are by weight unless otherwise stated.

EXAMPLE 1

A 1-liter glass reactor equipped with a stirrer, thermometer, and reflux condenser was charged with 539.0 grams of hexamethylcyclotrisiloxane, 43.7 grams of trimethylsilanol, and 29.1 grams of acetonitrile. In addition, 0.11 grams of a pentavalent silicon complex catalyst:

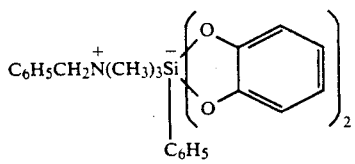

was added to the reactor and reaction was effected at 60° C. for 3 hours. The reaction mixture was cooled down, 44.1 grams of pyridine, 190 grams of toluene and 0.10 gram of BHT were added, and then 58.2 grams of γmethacryloxypropylmethyldichlorosilane was added dropwise with ice cooling and stirring. The mixture was stirred for 2 hours at room temperature. Thereafter, the reaction mixture was washed with diluted hydrochloric acid and then with water until the wash liquid was found neutral with a Bromothymol indicator. The crude product was dried over neutral anhydrous sodium sulfate and stripped of the toluene and minor amounts of low volatiles at 120° C. under a vacuum of 10 mmHg, yielding 564.3 grams of a colorless clear oil.

The oil had a viscosity of 25.8 centistokes at 25° C., a specific gravity of 0.964, a refractive index of 1.4068, and a weight average molecular weight of 2665 (theoretical value 2568) as calculated from its gel permeation chromatogram. The results of infrared (IR) absorption spectrum, nuclear magnetic resonance (NMR) spectrum, and elemental analysis are shown below.

Figure 2:
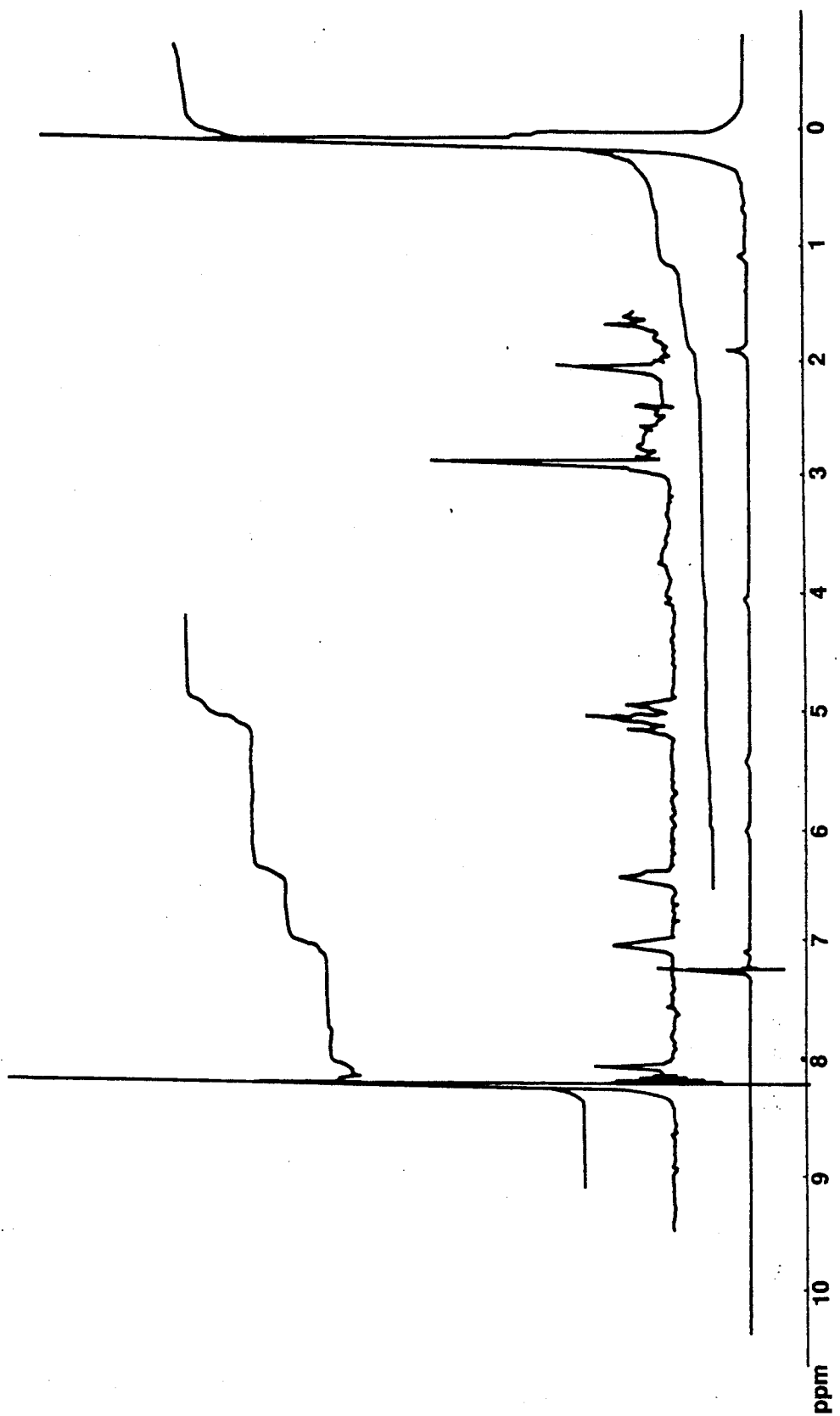

| IR absorption spectrum (see FIG. 1) | |
|---|---|
| Si—C 800 cm$^{-1}$, | Si—O—Si 1013, 1088 cm$^{-1}$, |
| Si—CH$_3$ 1256 cm$^{-1}$, | —C=C— 1636 cm$^{-1}$, |
| —CO— 1725 cm$^{-1}$,<br>‖<br>O | —CH$_2$— 2900 cm$^{-1}$, |
| —CH$_3$ 2950 cm$^{-1}$. | |
| NMR spectrum (see FIG. 2) | |
| internal standard: benzene δ 7.25 ppm | |
| δ (ppm) | |
| 0.10(S) Si—CH$_3$, | 0.38–0.75(m) Si—CH$_2$, |
| 1.40–1.80(m) C—CH$_2$—C, | 1.87–2.00(m) —C—C , <br>                        ‖     CH$_3$<br>                        O |
| 3.92–4.22(t) CH$_2$—OC—,<br>‖<br>5.98–6.08(m) =C—H | 5.38–5.52(m) =C—H, |

The methacryl equivalent (theoretical value 2568) was 2655 as calculated from the proton ratio to the internal standard.

| | Elemental analysis | | | |
|---|---|---|---|---|
| | Si | C | O | H |
| Found, % | 36.13 | 34.49 | 21.22 | 8.16 |

| -continued | | | | |
|---|---|---|---|---|
| | Elemental analysis | | | |
| | Si | C | O | H |
| Calculated, % | 35.90 | 34.67 | 21.11 | 8.31 |

The above-reported physical properties and analytical results confirm that the oily synthetic product is a methacryl functional dimethylpolysiloxane of the following formula (II):

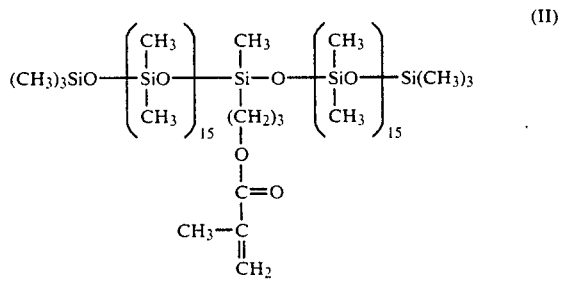

The methacryl functional dimethylpolysiloxanes of the following formulae (I), (III), and (IV) were synthesized by repeating the above procedure except that the amount of hexamethylcyclotrisiloxane was changed as shown in Table 1. The physical properties and analytical results of these compounds are reported in Tables 1 and 2.

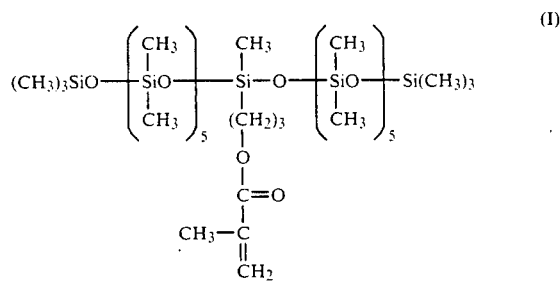

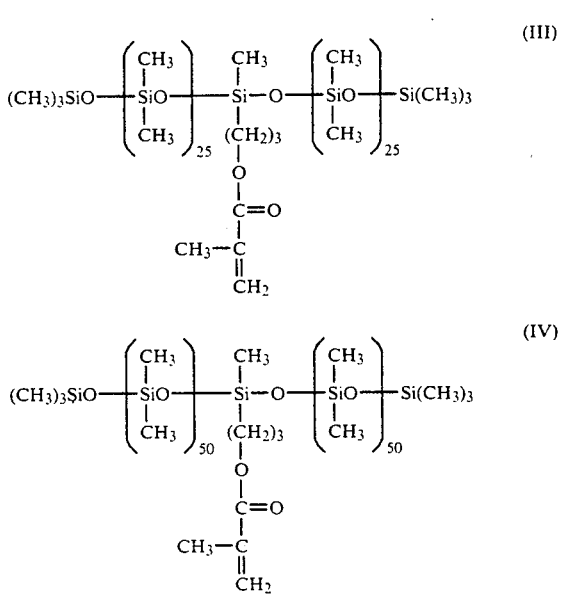

TABLE 1

| | Compound | | |
|---|---|---|---|
| | (I) | (III) | (IV) |
| Hexamethylcyclo-trisiloxane, grams | 79.7 | 898.3 | 1796.6 |
| Yield, grams | 238.1 | 879.5 | 1698.2 |
| Physical properties | | | |
| Viscosity, cs @ 25° C. | 11.9 | 52.2 | 118.3 |
| Specific gravity @ 25° C. | 0.951 | 0.970 | 0.974 |
| Refractive index @ 25° C. | 1.4062 | 1.4068 | 1.4063 |
| Weight average molecular weight | | | |
| Found | 1103 | 4216 | 7903 |
| Theory | 1088 | 4048 | 7748 |
| Methacryl equivalent | | | |
| Found | 1095 | 4207 | 8059 |
| Theory | 1088 | 4048 | 7748 |

TABLE 2

Figure 3:
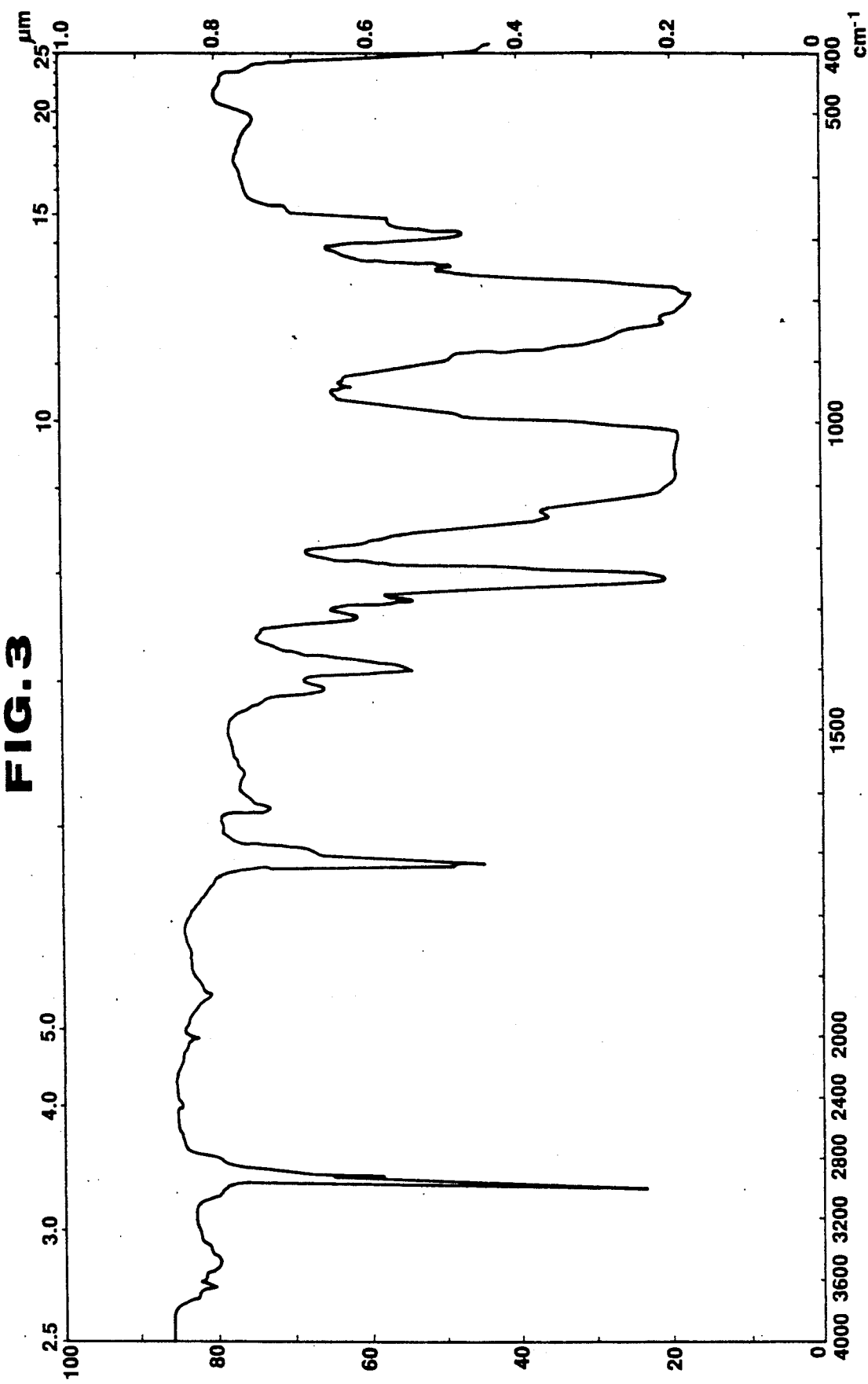
FIGS. 3, 4, and 5 are diagrams showing the infrared absorption spectra of Compounds (I), (III), and (IV), respectively.

| Compound | IR spectrum | | NMR spectrum | | Elemental Analysis | | | |
|---|---|---|---|---|---|---|---|---|
| | | | | | Found, % | | Calcd., % | |
| I | Si—C | 794 cm⁻¹ | δ(ppm) 0.10(s) | Si—CH₃ | | | | |
| | Si—O—Si | 1011, 1080 cm⁻¹ | 0.35~0.74(m) | Si—CH₂ | Si | 33.64 | Si | 33.49 |
| | Si—CH₃ | 1254 cm⁻¹ | 1.39~1.80(m) | C—CH₂—C | C | 37.35 | C | 37.46 |
| | —C=C— | 1635 cm⁻¹ | 1.85~1.99(m) | —C(CH₃)=(C=O)— | O | 20.58 | O | 20.55 |
| | —CO— (‖O) | 1724 cm⁻¹ | 3.90~4.22(t) | —CH₂—OC(‖O)— | H | 8.43 | H | 8.51 |
| | —CH₂— | 2950 cm⁻¹ | 5.37~5.53(m) | =C—H | | | | |
| | —CH₃ | 3020 cm⁻¹ (See FIG. 3) | 5.98~6.08(m) | =C—H | | | | |
| III | Si—C | 800 cm⁻¹ | δ(ppm) 0.10(s) | Si—CH₃ | | | | |
| | Si—O—Si | 1020, 1090 cm⁻¹ | 0.40~0.73(m) | Si—CH₂ | Si | 36.79 | Si | 36.70 |
| | Si—CH₃ | 1260 cm⁻¹ | 1.35~1.78(m) | C—CH₂—C | C | 33.70 | C | 33.76 |
| | —C=C— | 1637 cm⁻¹ | 1.85~2.00(m) | —C(CH₃)=(C=O)— | O | 21.35 | O | 21.30 |

TABLE 2-continued

Figure 4:
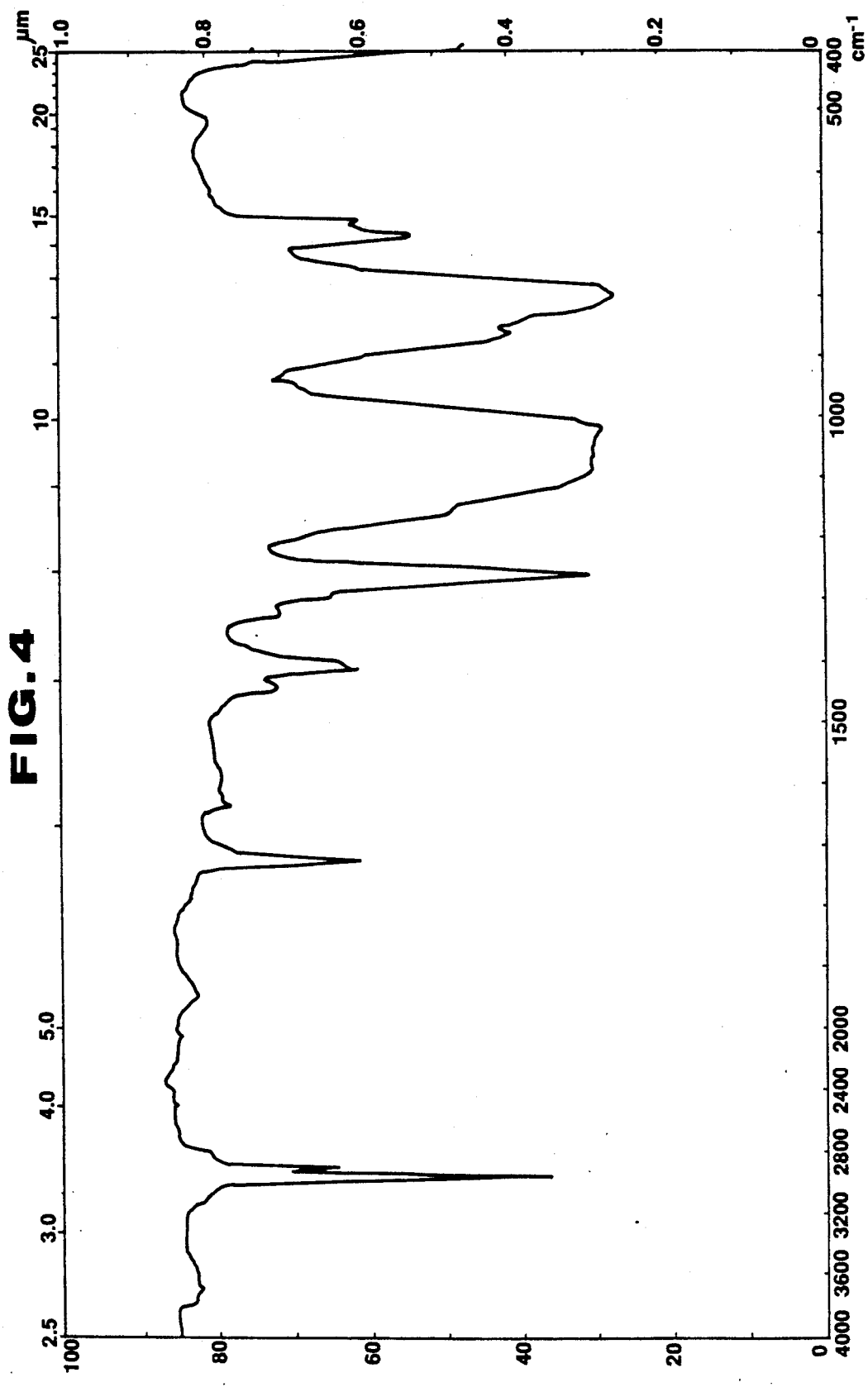
Figure 5:
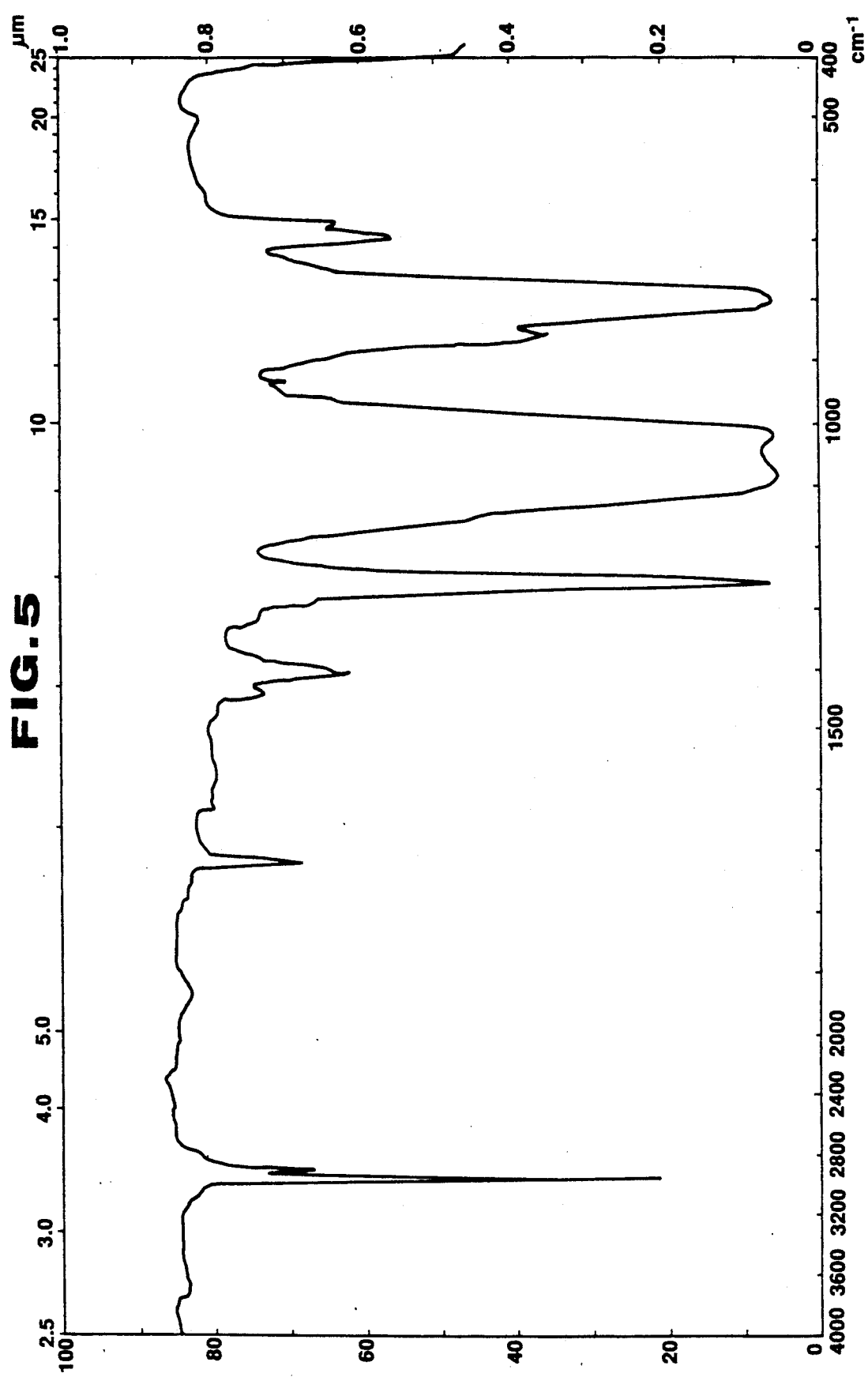

| Compound | IR spectrum | | NMR spectrum | | Elemental Analysis Found, % | | Calcd., % |
|---|---|---|---|---|---|---|---|
| | —CO—‖O | 1728 cm$^{-1}$ | 4.02~4.30(t) | —CH$_2$—OC—‖O | H | 8.16 | H 8.25 |
| | —CH$_2$—<br>—CH$_3$ | 2910 cm$^{-1}$<br>2970 cm$^{-1}$<br>(See FIG. 4) | 5.40~5.55(m)<br>6.00~6.10(m) | =C—H<br>=C—H | | | |
| IV | Si—C<br>Si—O—Si<br>Si—CH$_3$ | 800 cm$^{-1}$<br>1015, 1090 cm$^{-1}$<br>1257 cm$^{-1}$ | δ(ppm) 0.10(s)<br>0.35~0.75(m)<br>1.35~1.80(m) | Si—CH$_3$<br>Si—CH$_2$<br>C—CH$_2$—C | Si<br>C | 37.45<br>32.99 | Si 37.26<br>C 33.11 |
| | —C=C— | 1635 cm$^{-1}$ | 1.86~2.02(m) | —C—C(CH$_3$)‖O | O | 21.50 | O 21.43 |
| | —CO—‖O | 1728 cm$^{-1}$ | 4.00~4.25(t) | —CH$_2$—OC—‖O | H | 8.06 | H 8.20 |
| | —CH$_2$—<br>—CH$_3$ | 2900 cm$^{-1}$<br>2950 cm$^{-1}$<br>(See FIG. 5) | 5.42~5.56(m)<br>6.00~6.10(m) | =C—H<br>=C—H | | | |

Next, graft copolymers were prepared from the methacryl functional dimethylpolysiloxanes of the invention obtained in Example 1.

EXAMPLE 2: Preparation of Graft Copolymers

A mixture of 20 parts of Compound (II), 60 parts of methyl methacrylate, 20 parts of butyl methacrylate and 3 parts of azobisisobutyronitrile was added dropwise to 100 parts of toluene at 90° C. After the completion of addition, the reaction mixture was allowed to age at 90° C. for 5 hours, obtaining a graft copolymer A having a molecular weight of 10,000 as calculated on a polystyrene basis and containing 49% of nonvolatile matter.

Separately, a mixture of 35 parts of Compound (II), 50 parts of methyl methacrylate, 15 parts of butyl methacrylate and 3 parts of azobisisobutyronitrile was added dropwise to 100 parts of toluene at 90° C. After the completion of addition, the reaction mixture was allowed to age at 90° C. for 5 hours, obtaining a graft copolymer B.

A graft copolymer C was prepared by repeating the procedure for graft copolymer A except that Compound (II) was replaced by Compound (III).

For comparison purposes, a graft copolymer D was prepared by a similar procedure except that a mixture of 70 parts of methyl methacrylate, 30 parts of butyl methacrylate and 3 parts of azobisisobutyronitrile was added dropwise to 100 parts of toluene at 90° C.

Test pieces A, B, C, and D were prepared by spray coating graft copolymers A, B, C, and D on steel plates of 0.3 mm thick to a coating thickness of 20 μm and allowing the coated plates to stand at room temperature for one day. The test pieces were measured for critical surface tension and coefficient of dynamic friction by the following methods.

Critical surface tension

The contact angles θ of coatings of linear saturated hydrocarbons ranging from n-octane to n-hexadecane were measured. Critical surface tension was calculated by extrapolating cos θ to unity (1).

Coefficient of dynamic friction

A friction meter manufactured by Kyowa Kaimen Kagaku K.K. was used. Measurement was made with a friction element of a SUS stainless steel ball under a load of 100 grams at a speed of 50 mm/min.

The results are shown in Table 3.

TABLE 3

| Test Piece | Critical surface tension, dyn/cm | Coefficient of dynamic friction |
|---|---|---|
| A (graft copolymer A) | 22 | 0.24 |
| B (graft copolymer B) | 22 | 0.21 |
| C (graft copolymer C) | 21 | 0.22 |
| D (graft copolymer D) | 36 | 0.51 |

*D: outside the scope of the invention

As evident from Table 3, the graft copolymers obtained from methacryl functional dimethylpolysiloxane of the invention and vinyl monomers show a low critical surface tension and a low coefficient of dynamic friction, indicating improved water repellency, mold releasability and slip characteristics.

It was also found that the graft copolymers of the invention were improved in weatherability and gas permeability.

The methacryl functional dimethylpolysiloxanes of formula (1) according to the invention are useful reactants for graft copolymers since they can be copolymerized with vinyl monomers to form graft copolymers having improved water repellency, mold release properties, slip properties, weatherability, and gas permeability. Because of these features, the graft copolymers can be used as repellants for concrete, anti-sticker paint, anti-staining marine paint, and weather resistant paint.

Several preferred embodiments have been described. Obviously many modifications and variations of the present invention are possible in the light of the above teachings. It is therefore to be understood that within the scope of the appended claims, the invention may be practiced otherwise than as specifically described.

We claim:

1. A methacryl functional dimethylpolysiloxane having the general formula (1):

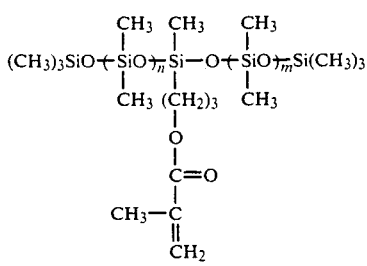
(1)

wherein letters n and m are independently an integer of from 2 to 50.

2. A graft copolymer comprising a methacryl functional dimethylpolysiloxane as set forth in claim 1 and a vinyl monomer copolymerized therewith, said vinyl monomer being selected from the group consisting of a $C_2$—$C_{10}$ alkene, acrylic acid, methacrylic acid, a $C_1$—$C_{20}$ alkyl ester of acrylic acid or methacrylic acid, a $C_1$—$C_{10}$ hydroxyalkyl ester of acrylic acid or methacrylic acid, a $C_1$—$C_{12}$ perfluoroester of acrylic acid or methacrylic acid, acrylamide, methacrylamide, styrene, α-methylstyrene, p-chloromethylstyrene, fumaric acid, maleic acid, fumaric anhydride, maleic anhydride, vinyltrimethoxysilane, γ-methacryloxy-propyltrimethoxysilane, acrylonitrile, vinyl pyrrolidone, butadiene, isoprene, chloroprene, cyclopentadiene, vinyl chloride, vinylidene chloride, vinyl acetate and allyl vinyl ether.

3. The methacryl functional dimethylpolysiloxane as set forth in claim 1 having a general formula selected from

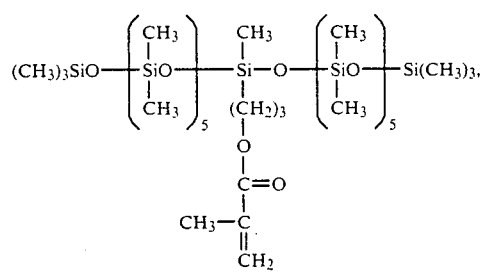
(I)

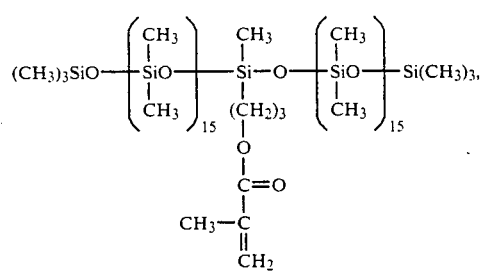
(II)

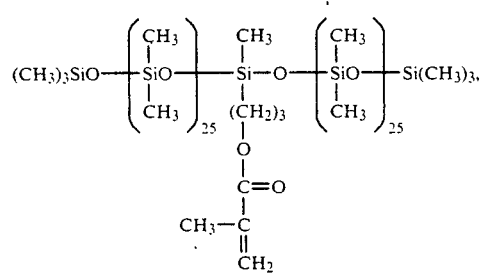
(III)

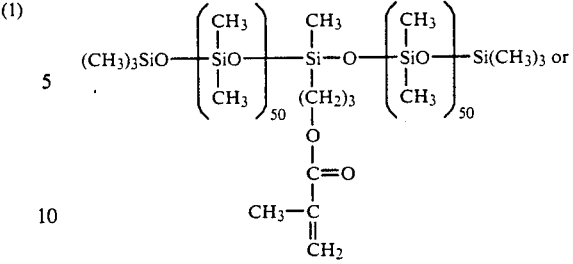
(IV)

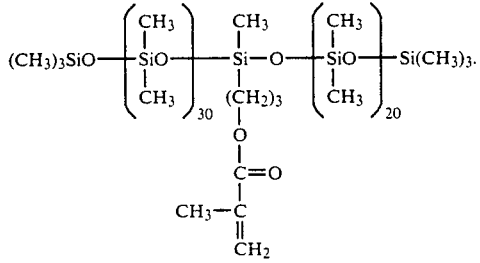
(V)

4. A method for producing a methacryl functional dimethylpolysiloxane having the general formula (1):

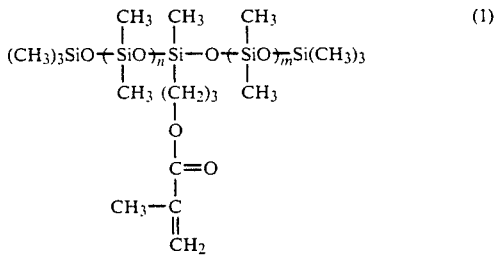
(1)

wherein letters n and m are independently an integer of from 2 to 50 comprising:

subjecting hexamethylcyclotrisiloxane having formula (2):

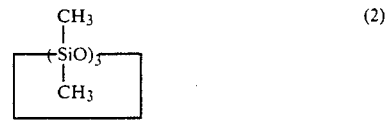
(2)

to ring opening polymerization in the presence of trimethylsilanol $(CH_3)_3SiOH$ and a pentavalent silicon complex catalyst to synthesize two single silanol-terminated compounds having formulae (3) and (4):

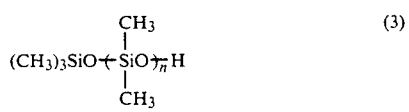
(3)

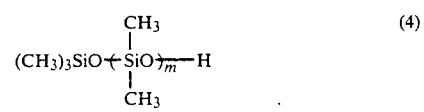
(4)

wherein letters n and m are as defined above,
mixing the single silanol-terminated compounds of formulae (3) and (4) with γ-methacryloxypropylmethyldichlorosilane in equimolar amounts, and dehydrochlorinating the mixture in the presence of a hydrogen chloride scavenger.

* * * * *